United States Patent
Wall et al.

(10) Patent No.: US 11,609,757 B1
(45) Date of Patent: *Mar. 21, 2023

(54) CONTINUOUS INTEGRATION FRAMEWORK FOR DEVELOPMENT OF SOFTWARE FOR EMV-BASED CARD PRESENT TRANSACTION PROCESSING

(71) Applicant: Stripe, Inc., San Francisco, CA (US)

(72) Inventors: Jonathan Wall, San Francisco, CA (US); Eric Glass, San Francisco, CA (US); Ross Favero, San Francisco, CA (US)

(73) Assignee: STRIPE, INC., South San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/373,503

(22) Filed: Jul. 12, 2021

Related U.S. Application Data

(63) Continuation of application No. 16/714,271, filed on Dec. 13, 2019, now Pat. No. 11,099,835.

(51) Int. Cl.
*G06F 8/65* (2018.01)
*G06F 11/36* (2006.01)
(Continued)

(52) U.S. Cl.
CPC .......... *G06F 8/658* (2018.02); *G06F 11/3652* (2013.01); *G06F 11/3664* (2013.01);
(Continued)

(58) Field of Classification Search
CPC .. G06F 8/658; G06F 11/3652; G06F 11/3664; G06F 11/3688; G06F 11/3692
See application file for complete search history.

(56) References Cited

U.S. PATENT DOCUMENTS

| 10,387,297 | B1 * | 8/2019 | Elgarat | G06Q 10/0633 |
| 11,099,835 | B1 * | 8/2021 | Wall | G06F 11/3664 |

(Continued)

*Primary Examiner* — Philip Wang
(74) *Attorney, Agent, or Firm* — Womble Bond Dickinson (US) LLP

(57) ABSTRACT

A continuous integration framework for developing software for transaction processing and method for using the same are described. In one embodiment, the method comprises generating a trusted artifact with a forward immutable continuous integration (CI) implemented as a build pipeline, wherein the artifact comprises updated software comprising payment processing code with an EMV vector kernel for processing of EMV-based card present transactions; and in response to the software update, performing end-to-end testing of EMV card present transactions using code commits from one or more code repositories, wherein the end-to-end testing comprises executing the code commits that includes executing payment processing code for processing EMV-based card present transactions with an EMV vector kernel and one or more emulated EMV cards, and running tests against the executing code commits to validate behavior the payment processing code including the EMV vector kernel, wherein the tests comprise running one or more emulated EMV cards against the vector kernel as part of one or more emulated EMV-based card present transactions and monitoring communications related to the one or more emulated EMV-based card present transaction communications.

20 Claims, 7 Drawing Sheets

---

Generate a trusted artifact with a forward immutable continuous integration (CI) implemented as a build pipeline, where the artifact comprises updated software comprising payment processing code with an EMV kernel for processing EMV-based card present transactions
401

↓

Perform end-to-end testing of card present transactions using code commits from one or more code repositories
402

↓

Store signed, trusted software code in a repository for deployment, where the repository only accepts signed software code for deployment
403

↓

Deploy the signed software code
404

(51) Int. Cl.
*G06F 8/658* (2018.01)
*G06K 7/00* (2006.01)
(52) U.S. Cl.
CPC ...... *G06F 11/3688* (2013.01); *G06F 11/3692* (2013.01); *G06K 7/0008* (2013.01)

(56) References Cited

U.S. PATENT DOCUMENTS

| | | | |
|---|---|---|---|
| 11,416,861 B1* | 8/2022 | Hubley | G06F 16/2365 |
| 2009/0294526 A1* | 12/2009 | Maw | G06K 7/0008 |
| | | | 235/380 |
| 2015/0220426 A1* | 8/2015 | Spektor | G06F 8/71 |
| | | | 717/131 |
| 2016/0196322 A1* | 7/2016 | Xu | G06F 16/1734 |
| | | | 707/611 |
| 2016/0267486 A1* | 9/2016 | Mitra | G07F 7/0846 |
| 2017/0200148 A1* | 7/2017 | Ulrich | G07G 1/0009 |
| 2018/0027051 A1* | 1/2018 | Parees | G06F 8/71 |
| | | | 709/217 |
| 2018/0068303 A1* | 3/2018 | Wall | H04L 9/3247 |
| 2018/0083840 A1* | 3/2018 | Poonen | H04L 41/12 |
| 2018/0089066 A1* | 3/2018 | Barnett | G06F 11/0778 |
| 2018/0365133 A1* | 12/2018 | Mitchell | G06F 8/60 |
| 2019/0294528 A1* | 9/2019 | Avisror | G06F 11/3688 |
| 2019/0340113 A1* | 11/2019 | Earanti | G06F 11/3688 |
| 2020/0186355 A1* | 6/2020 | Davies | H04L 63/123 |

* cited by examiner

CONTINUOUS INTEGRATION FRAMEWORK FOR DEVELOPMENT OF SOFTWARE FOR EMV-BASED CARD PRESENT TRANSACTION PROCESSING

RELATED APPLICATION

The present application is a continuation of and claims the benefit of U.S. patent application Ser. No. 16/714,271 filed on Dec. 13, 2019 and entitled "CONTINUOUS INTEGRATION FRAMEWORK FOR DEVELOPMENT OF SOFTWARE FOR EMV-BASED CARD PRESENT TRANSACTION PROCESSING", which is incorporated by reference in its entirety.

FIELD OF THE INVENTION

Embodiments of the present invention relate to the field of build systems for creating and deploying software and/or other artifacts; more particularly, embodiments of the present invention relate to automatically deploying software and/or other artifacts.

BACKGROUND

Merchants, such as grocers, car services, dry cleaning services, etc., provide their products and services to customers for a fee. To collect fees for products or services provided, a merchant will typically enter an amount to be collected in a point of sale (POS) device, the POS device will communicate this data to a terminal device (e.g., a PIN pad terminal, PIN pad device, or other payment terminal), and a card reader of the terminal device will collect card data, such as Europay, Mastercard, or Visa data collected from a credit, debit, gift card, electronic benefits, or other payment instrument provided by the customer. In order to collect the card data, a magnetic strip, an integrated circuit (IC) of the card, or communications generated by a near field communications (NFC) interface is read by a card reader of the terminal device. Cards that include an integrated circuit (e.g., integrated circuit cards, or ICCs) and/or NFC capabilities may be referred to as EMV or "smart" cards because the IC and/or NFC capabilities include logic that enables the card to generate data during a transaction, and respond to requests of the card reader. EMV is a technical standard for smart payment cards, which include an IC or chip embedded into the card. The standard also applies to payment terminals (e.g., the terminal discussed above) and automated teller machines that can accept such smart payment cards. EMV stands for Europay, MasterCard, and Visa, who created the standard. Smart payment cards are referred to as "EMV cards," "chip cards," IC cards, or ICCs, for example. That card data collected by the reader and any other data generated during the transaction is then used by the POS device and/or the terminal to authorize the transaction by, for example, further interacting with a commerce platform, card brand systems, issuing bank systems, etc., to ultimately approve and charge the fee for the merchant.

A major challenge for developer productivity in the context of card present, and EMV in particular, is the cumbersome nature of testing both as part of development and ultimately for certification. Card readers, terminal devices or PIN pad devices, and/or POS devices handle sensitive financial information during transactions, such as credit card numbers, and are therefore subject to certification requirements before they can be used by merchants. For example, a certification test for a card brand, bank, and or the payment card industry (PCI) data security standard involves performing several test transactions in which test cards interface with a reader (e.g. integrated circuit, magnetic strip, contactless interface, etc.), different transactions are run (e.g., charges for predetermined amounts, reversals, time-outs, etc.), and the data generated during the transaction by the card reader and/or terminal device is collected. The collected data is provided to a certification system, such as a testing and certification system associated with a card brand, a bank, a payment processor, or any organization that seeks to deploy the card reader and/or terminal device. The certification system then verifies that the right data in the right format is passed during certain stages of each transaction. When the collected data can be verified, the card reader and/or terminal device, and the software controlling the transactions, can be certified as functioning properly so that the terminal device can be deployed by a merchant and/or used with a POS device of the merchant.

The above described certification process is labor intensive, as it typically involves a human operator repeatedly running a series of transactions with different physical cards. This becomes even more labor intensive as new/updated software for controlling transaction flow in a card reader and/or terminal device is updated, as new reader, terminal device, and/or POS devices are deployed to a merchant, or a combination thereof. For example, user interface changes, transaction processing changes, new hardware device integration, etc. may each require new certifications.

SUMMARY

A continuous integration framework for developing software for transaction processing and method for using the same are described. In one embodiment, the method comprises generating a trusted artifact with a forward immutable continuous integration (CI) implemented as a build pipeline, wherein the artifact comprises updated software comprising payment processing code with an EMV vector kernel for processing of EMV-based card present transactions; and in response to the software update, performing end-to-end testing of EMV card present transactions using code commits from one or more code repositories, wherein the end-to-end testing comprises executing the code commits that includes executing payment processing code for processing EMV-based card present transactions with an EMV vector kernel and one or more emulated EMV cards, and running tests against the executing code commits to validate behavior the payment processing code including the EMV vector kernel, wherein the tests comprise running one or more emulated EMV cards against the vector kernel as part of one or more emulated EMV-based card present transactions and monitoring communications related to the one or more emulated EMV-based card present transaction communications.

BRIEF DESCRIPTION OF THE DRAWINGS

The present invention will be understood more fully from the detailed description given below and from the accompanying drawings of various examples and examples which, however, should not be taken to the limit the invention to the specific examples and examples, but are for explanation and understanding only.

DETAILED DESCRIPTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Overview

Methods and apparatuses for developing and testing software code are described. In one embodiment, the software being developed is code for performing some portion of an EMV card present transaction. This may include, but is not limited to, code for an EMV terminal device, including the EMV kernel, etc.

In one embodiment, the software development and testing is performed using a framework that builds trusted and secure software code and/or artifacts. In one embodiment, each artifact includes software code, such as, for example, soft ware code compiled and tested for deployment (e.g., released code or executable code). In one embodiment, the built software code and/or artifacts is stored in a repository for on-demand retrieval or deployment.

In one embodiment, the framework uses a continuous integration (CI) build environment to produce the trusted and secure artifacts. In one embodiment, the framework is implemented using a build system having a trusted input, a secure build pipeline and a signed output. The secure build pipeline includes build and test pipeline stages. In one embodiment, the secure build pipeline has a property of forward immutability between pipeline stages and is both trusted and hermetic.

In one embodiment, the CI build environment includes testing to be performed on updated software code prior to deployment. As code may be readily updated, the CI provides for a continuous testing environment for use in the development of software.

Figure 1:
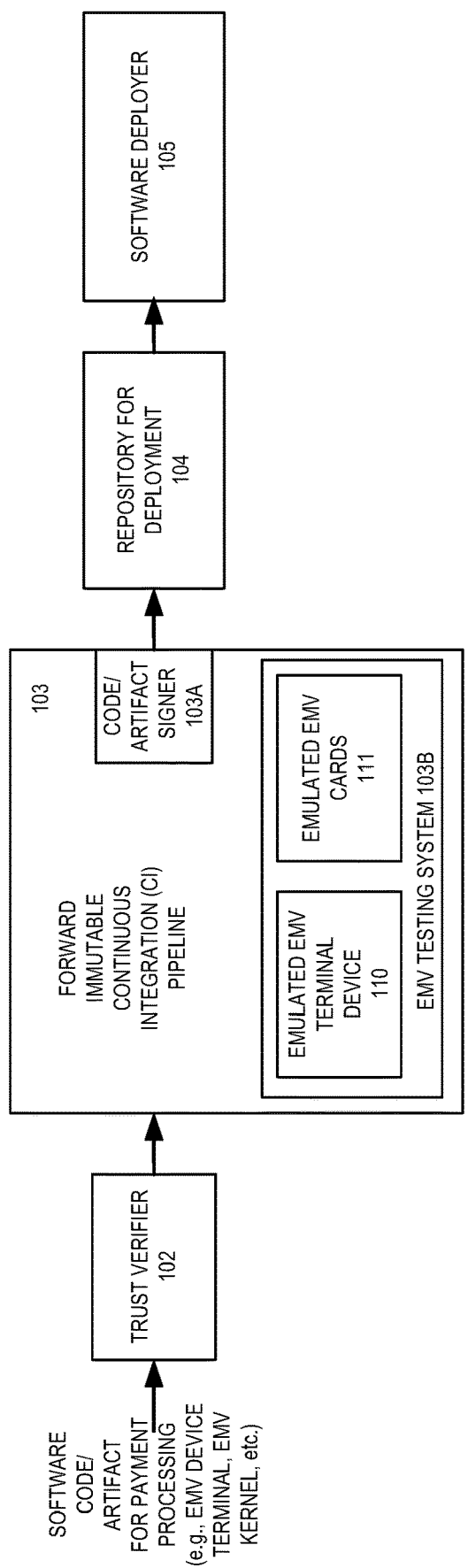
FIG. 1 is a data flow diagram of a forward immutable continuous integration build framework.

FIG. 1 is a data flow diagram of a forward immutable continuous integration (CI) build framework. In one embodiment, the CI framework allows developers to integrate code into a shared repository. This may be performed a number of times over a predetermined period of time (e.g., multiple times a day). Each code that is checked into the repository is verified by a build, allowing the detection of problems early in development. In one embodiment, the framework is implemented with one or more computer systems, servers, hardware, software, and or firmware.

Referring to FIG. 1, a trust verifier 102 receives inputs 101 and verifies their trustworthiness. In one embodiment, inputs 101 include one or more instances of software code. In one embodiment, the one or more instances of software code include code related to payment processing. The payment processing related code may include an EMV terminal device EMV kernel. Each instance of software code may include one or more, for example, but not limited to, machine images (e.g., an Amazon Machine Image (AMI), etc.), a software source (e.g., an open source software source) produced by Jenkins or some other server-based system, files from a repository (e.g., a Github Enterprise repository, etc.). In another embodiment, inputs 101 include one or more artifacts. The artifacts may include software code or instances of code as set forth above. In one embodiment, one or more of inputs 101 are obtained from a repository.

In one embodiment, trust verifier 102 verifies the trustworthiness of inputs 101. In one embodiment, trust verifier 102 performs a file verification and authentication process to verify the integrity of inputs 101. In one embodiment, the file verification is performed using hash-based verification that compares a hash value (e.g., a cryptographic hash value) that it generates for an input (e.g., a file) with a hash value stored with the input (e.g., the file). If the values match, then trust verifier 102 concludes that the input hasn't been modified during storage by an untrusted third party. In alternative embodiments, trust verifier 102 uses other tools for verification and authentication such as, for example, digital signatures.

After trust verification, the inputs are provided or otherwise made available to a forward immutable continuous integration (CI) pipeline 103 in order to create software code for deployment. In other words, in one embodiment, trust verifier 102 stores trusted code into a repository for access by the pipeline 103. In one embodiment, a procedure for pipeline 103 is triggered automatically when the software code is committed to the repository by trust verifier 102. Alternatively, pipeline 103 is triggered in response to a notification that trusted code is available for pipeline 103. Pipeline 103 could be triggered to operate in response to a manual input.

In one embodiment, pipeline 103 is implemented as a build pipeline that has a plurality of stages with forward immutability between consecutive pipeline stages to receive the one or more inputs verified as trustworthy and to build and test software. The software may be part of one or more containers associated with the one or more inputs. In one embodiment, in the build pipeline, each subsequent stage after a first stage of the build pipeline depends on an immutable output of an immediately preceding stage in the build pipeline.

In one embodiment, the build pipeline receives notification of the availability of software code, and then compiles the software code and runs integration tests on the software code. After integration testing is done, the build pipeline creates images (e.g., machine images, AWI, etc.) that contains the software code for deployment. For example, the AWI may contain fully baked and built software code to deploy a complete running instance, including the installation and configuration of all required software (e.g., an application, application runtime environment, and an operating system).

In one embodiment, the pipeline includes an emission stage 103A for outputting signed, trusted software code from the pipeline. In one embodiment, emission stage 103A only outputs code or an artifact that has been signed. In one embodiment, the signing is done using a key. For example, in one embodiment, the signing is performed using a GPG key of the person updating and/or modifying the software. In another embodiment, the signing is performed using keys of the person modifying the software and any individual reviewing and/or approving the modification. Note that a policy associated with the software code being developed may dictate the signing required for output from the pipeline. For example, an update to software that is considered to have more importance or criticality to an organization may require a higher level or greater number of approvers/reviewers that dictate the signing (or amount thereof) necessary for output from emission stage 103A of the pipeline.

After signing and output from emission stage 103A, the signed, trusted software code is stored in a repository 104 for deployment using software deployer 105. In one embodiment, repository 104 only accepts signed software code. In one embodiment, repository 104 has a registry service, such as, for example, a Docker Hub, and the signed software code images are pushed there so that they may be deployed using software deployer 105.

In one embodiment, software deployer 105 deploys the software in a manner well-known in the art. In one embodiment, software deployer 105 includes a deploy pipeline of deploying code to one or more servers through various stages.

Thus, the forward immutable continuous integration (CI) build framework of FIG. 1 serves as a path for software deployment. Additional details associated with implementations of the above referenced operations, including each of each stages of the forward immutable CI pipeline are described in more detail below.

As discussed above, in one embodiment, CI pipeline 103 performs testing of the software. In one embodiment, CI pipeline 103 includes or access an EMV testing system 103B. In one embodiment, EMV testing system 103B comprises one or more server computers, desktop computers, etc. that include typical computing hardware (e.g., one or more processors, memory, a communications bus, a network interface, etc.), as illustrated and discussed with respect to FIG. 8 below.

In one embodiment, EMV testing system 103B includes an emulated EMV terminal device 110 and emulated EMV cards 111. In one embodiment, emulated EMV terminal device 110 may be a virtualized or simulated EMV terminal device in which the hardware components are virtual or simulated components executed by a computer system. In one embodiment, emulated EMV terminal device 110 implements a card-present transaction process by executing an EMV kernel where card data is collected from emulated EMV cards 111 and used during a simulated transaction. As discussed herein, emulated EMV cards 111 simulates one or more physical EMV cards. EMV cards, also referred to as "smart cards", typically include an integrated circuit (IC), near field communication (NFC) interface, a magnetic strip, or a combination, which are each simulated as emulated EMV card 111 to simulate physical EMV card(s) capable of interacting with simulated hardware components (e.g., magnetic strip reader, IC interface, NFC interface, etc.) of emulated EMV terminal device 110 during a PCI compliant transaction flow. For example, during the transaction flow between emulated EMV card 111 and emulated EMV terminal device 110, data is exchanged between an emulated EMV card and an emulated EMV terminal device including an interface being established (e.g., IC to reader device interface, NFC interface, etc.), transaction parameters being negotiated, encryption keys being exchanged, identifiers being exchanged, and data further being exchanged between emulated EMV terminal device emulator with card brand systems, banks, commerce platform 130, etc. However, in embodiments, data is not exchanged with external systems during EMV card simulation and EMV terminal device testing, and instead a record of communications that would be exchanged with such external systems is stored by an EMV testing coordinator (not shown) of EMV testing system 110. Embodiments of techniques and systems for an EMV terminal device which may be simulated by emulated EMV terminal device, including vector kernels for performing transaction processing with an emulated EMV card, are described in U.S. Patent Application No. 2018/0068303, filed on Sep. 8, 2017, titled "EMV KERNEL FOR FASTER PROCESSING," the disclosure of which is incorporated by reference in its entirety.

In one embodiment, the vector kernel executed by emulated EMV terminal device 110 for transaction processing is developed by engineers associated with a commerce platform server(s), for example, using CI pipeline 103, which is a computer processing system, server computer, etc. that manages software development processes. For example, CI pipeline 103 can manage versioning, compilation, rollback, bug reporting, error ticket distribution, tracking, clearance, and other processes typically associated with software development. Thus, engineers associated with the development of the vector kernel and/or other software for use by an EMV terminal device may therefore edit various aspects of the software to be executed by the EMV terminal device, for example, to customize an operating system, customize interfaces for a specific card brand, merchant, etc., refine/update the vector kernel for transaction processing improvements, as well as for other tasks in which software may be edited, recompiled, and then distributed to EMV terminal devices.

Once a software update is available from CI pipeline 103, it may be executed by the EMV testing system 103B for testing. Similarly, emulated EMV terminal device emulator 110 may emulate a new device not yet deployed by merchants, commerce platform, or others, and an existing software version of CI pipeline 103 may be run on emulated EMV terminal device 110 for testing the hardware operations of the new device. In one embodiment, certification requirements from card brands, merchants, commerce platform, as well as other systems involved with transaction processing may include verification of device configurations, encryption protocols, the proper execution of transactions for a number of test cases, generation of expected results in the test cases, data exchanged during transactions meeting certain requirements, or other factors that are required to be verified for certification purposes. Similarly, Payment Card Industry (PCI) compliance may also be required to be satisfied for newly developed software.

Therefore, in one embodiment, EMV terminal device software to be tested is run as emulated EMV terminal device 110 by EMV system 125 using EMV testing system 103B, which simulates a plurality of EMV cards as emulated EMV card(s) 111 for executing a plurality of different predefined transactions by emulated EMV terminal device 110 for software being tested (e.g. an updated OS, an updated vector kernel, a new device running new/existing software, etc.).

In one embodiment, EMV testing system 103B may be executed as a virtual machine on a computer processing system, and therefore hardware components associated with EMV cards (e.g. ICs, magnetic strips, NFC components, etc.) and an EMV terminal device (e.g., IC reader, network interface(s), processor, memory, display, vector kernel, OS executed by the reader device's processor, etc.) may be simulated. EMV testing system 103B then executes a testing process of an EMV testing coordinator that configures transactions between emulated EMV terminal device 110 being tested (e.g. transaction type, amount, etc.), and configures one or more simulated EMV cards during each of the transactions. For example, the simulated transactions can include running a sequence of different transaction types (e.g., purchase, refund, cancellation, etc.) using different simulated EMV cards (e.g., numbers, card brands, card owners, etc.) for generating data provided to emulated EMV terminal device 110 consistent with the different stages of transaction processing during the simulated transaction(s). For example, emulated EMV card 111 and/or emulated EMV terminal device 110 simulate stages of EMV transactions including negotiating parameters of communication, generating dynamic responses to/from emulated EMV terminal device 110 and emulated EMV card 111 (e.g., generating checksums, supplying data, etc. by an emulated IC and/or an emulated vector kernel), interacting with EMV testing and certification endpoint(s) and/or commerce platform server(s) (e.g., to test the establishment of connections, data exchange, etc. with remote systems), as well as generating other data as would be generated by an EMV card and/or EMV terminal device during a transaction process. That is, emulated EMV card 111 and emulated EMV terminal device 110 of EMV testing system 103B simulate the typical messaging and data generation that would be performed by a physical EMV card's IC, NFC interface, or magnetic strip during the transaction flow implemented by the vector kernel executed by a physical EMV terminal device. However, EMV testing system 103B performs the card simulation, for example using a virtualized computing environment, a standalone application, a physical computing device, different virtual or remote computing device communicatively coupled with on another via a network, etc., so that any number of cards, transactions, and messaging can be simulated during test transactions run on emulated EMV terminal device 110 by EMV testing system 103B.

In one embodiment, EMV testing system 103B may further include testing management using an EMV testing coordinator. For example, different card brands, different merchants, different commerce platforms, the PCI, etc. may each have their own compliance requirements, such as specific transactions (e.g., purchases, returns, time outs, rejections, etc.) that must be performed correctly for certification to occur. Furthermore, different terminal devices, new terminal devices, planned regional deployments, etc. may also have their own compliance and/or transaction requirements (e.g., based on local laws, customer requirements, etc.). Thus, in one embodiments any number of different certification tests may be configured to be run by the EMV testing coordinator of EMV testing system 103B that define a number of cards, the characteristics of each card, transactions and transaction parameters for a plurality of tests, etc. to be simulated by emulated EMV card 111 and/or emulated EMV terminal device 110 based on the requirements associated with the certification being performed.

In one embodiment, the expected transaction flow, data generated during a transaction, transaction output, etc. are known for each testing case. That is, for each stage of a vector kernel execution of a transaction flow, the data, communications, etc. at each stage have a known type/output. Therefore, in embodiments, failure to satisfy the expected transaction parameters is used by the EMV testing coordinator of EMV testing system 103B to generate ticket(s) and/or bug reports that are provided to CI pipeline 103. In one embodiment, the ticket(s) and/or bug reports can identify the test scenario, card brand, vector kernel version being tested, vector kernel process operation, output data, or any other information from the test case in which the error was encountered. In one embodiment, this information may be used by CI pipeline 103 to assign the bug report and/or ticket to specific software developers and/or departments associated with characteristics of the error, version of the vector kernel, etc. For example, developers responsible for software in the vector kernel for performing cardholder verification would receive ticket(s)/report(s) when errors are encounter at that stage of testing for simulated card/card(s), errors/bugs in processing card interface establishment would similarly be directed to the appropriate software developers and/or team, errors/bugs in the exchange and usage of encryption keys and/or checksums would also be directed to the appropriate software developers and/or team, and so on.

However, in embodiments, where no errors and/or bugs are detected for a testing sequence, the testing results may be used by EMV testing coordinator 112 of EMV testing system 110 to generate a settlement file. In embodiments, the settlement file is provided to EMV testing and certification endpoint(s) 140 to verify the data within the settlement file. For example, a card brand can verify that the transactions, data generated during transactions, communication protocols, device configurations, etc. satisfy certification requirements for performing card present transactions using EMV terminal devices (e.g., those of the same type simulated by emulated EMV terminal device 111) and executing transaction processing software associated with the tested software (e.g., a tested operating system version, a tested vector kernel version, etc.).

In embodiments, different classes or models of EMV terminal devices may be subject to their own certification before deployment and use during transactions. Similarly, existing devices may also be subject to their own certification before software updates may be distributed to those devices. In embodiments, the testing and simulation of EMV cards for specific transaction sequences using different simulated EMV terminal devices, as described herein, greatly improves the efficiency of testing and/or certifying EMV transaction processing by new and/or updated software and/or hardware systems. Furthermore, customization of testing scenarios is enabled, so that each card brand, commerce platform, issuing bank, the PCI, etc., can have their certification requirements tested and fulfilled using the testing system described herein. Additionally, in the event an error does occur in software being tested, the reporting and routing of the error reports is improved by directing the reports to responsible parties for enabling a more efficient software development, testing, and deployment cycle.

In one embodiment, transaction data (e.g., such data as may be received from a POS device for a transaction) is provided to emulated EMV terminal device 110 to initiate the transaction process performed by the EMV vector kernel (such as communicating a transaction type, a transaction amount, etc.). In one embodiment, the vector kernel performs a series of operations in a transaction flow to process the transaction, such as powering a reader interface, setting clock signals, performing negotiations with an EMV card, selecting an application to perform processing that may or may not be based on a type of simulated card (e.g., Europay card, Mastercard card, Visa card, American Express, gift cards, etc.), as well as other operations performed by a kernel that performs transaction processing. Embodiments of operations performed by a vector kernel during transaction processing are described in U.S. Patent Application No. 2018/0068303, filed on Sep. 8, 2017, titled "EMV KERNEL FOR FASTER PROCESSING," the disclosure of which is incorporated by reference in its entirety.

In one embodiment, emulated EMV card 110 then interacts with the EMV vector kernel of emulated EMV terminal device 110 through the simulated interface (e.g., an emulated pipe) by simulating responses to the operations performed by the EMV vector kernel. For example, if EMV vector kernel requests the generation of a checksum, emulated EMV card 110 responds accordingly with a checksum generated from data associated with a simulated card, data received from EMV vector kernel, etc. Therefore, emulated EMV card provides the EMV vector kernel data (e.g. static data, such as card data, identifiers, encryption keys, magnetic strip data, etc., and dynamic data, such as requested computations generated by an IC, NFC interface, etc.) consistent with the operations performed by an IC and/or NFC logic of an EMV card when interacting with the EMV vector kernel, which are provided to emulated EMV terminal device 110 via IC, NFC, and/or magnetic strip simulator.

In one embodiment, the data generated by emulated EMV card 110 and provided to emulated EMV terminal device 1111 via the interface is the expected data in the expected format at the times expected by the EMV vector kernel during transaction processing. Furthermore, this data is supplied by a EMV transaction simulator for any number of unique transactions (e.g., purchases, refunds, time outs, etc., unique simulated EMV cards (e.g. cards of different types, different issuing banks, different card numbers, etc.), unique interface methods (e.g., IC, NFC, magnetic strip), etc., as well as sequences of transactions maintained in testing and certification sequences. Additionally, based on testing scenario, different sequences of transactions and simulated card data may be used by emulated EMV card 110 and emulated EMV terminal device 111.

In one embodiment, the EMV vector kernel may further interact with EMV testing and certification endpoint, such as by forwarding charges to EMV testing and certification endpoint as would normally be performed in an actual transaction, but which are provided to systems configured for participating in card present transaction testing. In other embodiments, the communications that would be transmitted to a remote system, such as EMV testing and certification endpoint, are instead captured by an EMV testing coordinator, and recorded to a settlement file.

In one embodiment, the data generated during transaction processing by the EMV vector kernel, the provided response generated by EMV card emulator, communications exchanged with or destined for EMV testing and certification endpoint, transaction results, etc. is collected into a settlement file by a testing interface of an EMV testing coordinator. The settlement file may then be communicated to EMV testing and certification endpoint for certification of the software being tested by execution of emulated EMV terminal device 110, for certification of an updated vector kernel or other software system to be deployed on EMV terminal devices.

In one embodiment, where an error occurs during testing, such as failure to generate and/or received expected data, perform expected transaction operations, obtain certain transaction results, operation timing errors, etc., testing and certification sequences generates a bug report and/or issue ticket, which is provided to testing interface. This bug report and/or issue ticket may then be communicated by testing interface to CI pipeline 103. Furthermore, in embodiments, the settlement file is not transmitted to EMV testing and certification endpoint for certification purposes until execution of a testing scenario does not generate relevant bug reports/issue tickets.

In one embodiment, to facilitate test driven development and continuous builds without requiring specialized hardware (e.g., a robot to insert EMV cards), software emulated EMV cards are used and the testing system is able to take static input (e.g., a card number, etc.) and emulate the behaviors of an EMV card complete with network specific dynamic cryptograms and signatures.

The testing system uses tests cases are used to validate the behavior of all aspects of the EMV vector kernel and the various applications that run against the EMV vector kernel (e.g., Visa and Interac EMV applications personalized onto EMV cards, etc.)

In one embodiment, for continuous builds, the tests include L2 and L3 certification tests run against each code commit.

To facilitate CI testing, the application for the EMV terminal device, including the EMV kernel and the EMV card reader/interface (e.g., pin pad) can be run with emulated hardware in a Portable Operating System Interface (POSIX) environment. This allows for the CI testing of the application layer software and the EMV vector kernel. In such a configuration, the application, including the vector kernel are running locally and emulated EMV cards and/or magstripe cards can be introduced to the application to test the entirety of the (non-hardware specific) transaction path.

Figure 2:
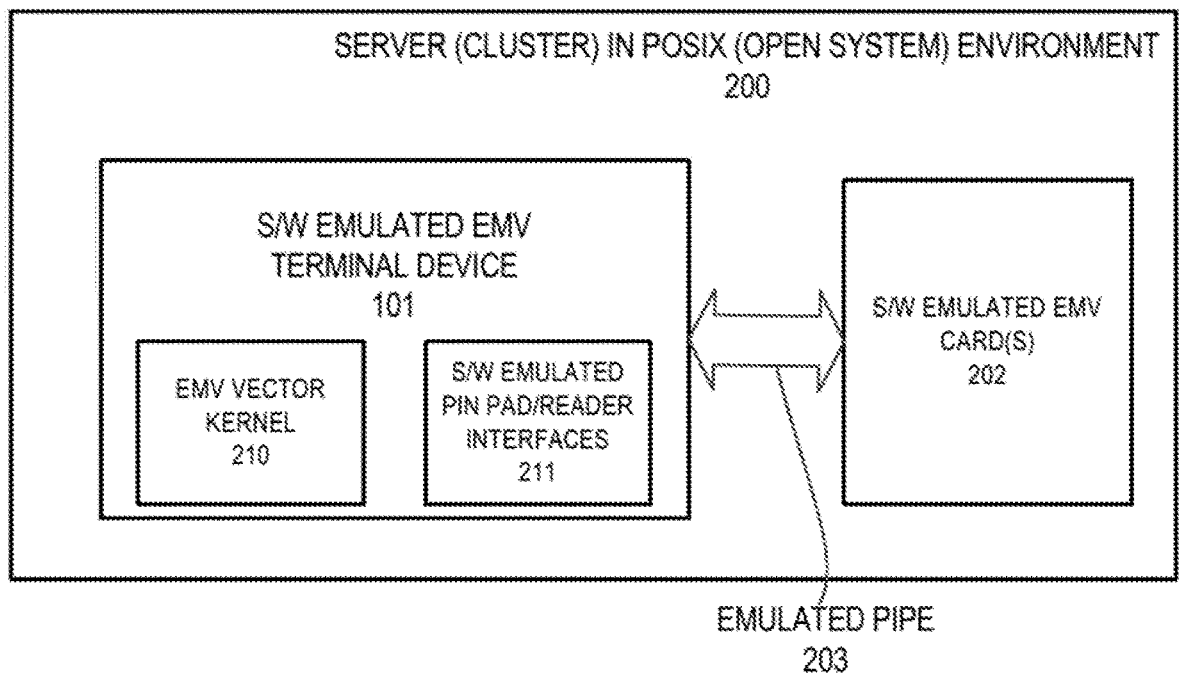
FIG. 2 is an example of an open-system (e.g., POSIX) testing environment for performing end-to-end EMV card present transactions.

In one embodiment, in this scenario, the application and the EMV vector kernel are running in a POSIX, or other open system, environment communicating with an emulated EMV card via a pipe instead of an EMV card running the same application on the far side of a wired bus. FIG. 2 is a block diagram of such an environment. Referring to FIG. 2, a server that is part of a cluster is in a POSIX (open system) environment 200. In POSIX environment 200 is a software emulated EMV terminal device 201 and a software emulated EMV card(s) 202 that communication via an emulated communication pipe 203. Software emulated EMV terminal device 201 includes EMV vector kernel 210 and emulated reader/interface (e.g., pin pad) 211.

The environment of FIG. 2 can be used to run test cases. For example, in one test case, the cluster is launched on a single development box. In one embodiment, a POSIX version of EMV terminal device (reader/interface with the pin pad and the EMV kernel) is run on the same server and configured to route to the local cluster. Emulated EMV cards are then run against the local EMV terminal device application. In one embodiment, the emulated EMV cards comprise an implementation of EMV in Java with test keys from authorization networks, which commonly available today, to use for confirmation during testing that an EMV card is a card of the respective authorization network in a test environment. When this occurs, the traffic flows through the local server and is validated. The results of the validation are returned to the emulated EMV terminal device for validation by the EMV terminal device application, and subsequently by the emulated EMV card.

In one embodiment, the testing system code commits associated with payment processing code that includes code in addition to the code for the EMV kernel and the emulated EMV cards. In one embodiment, this code include code for authorizing a transaction.

Figure 3:
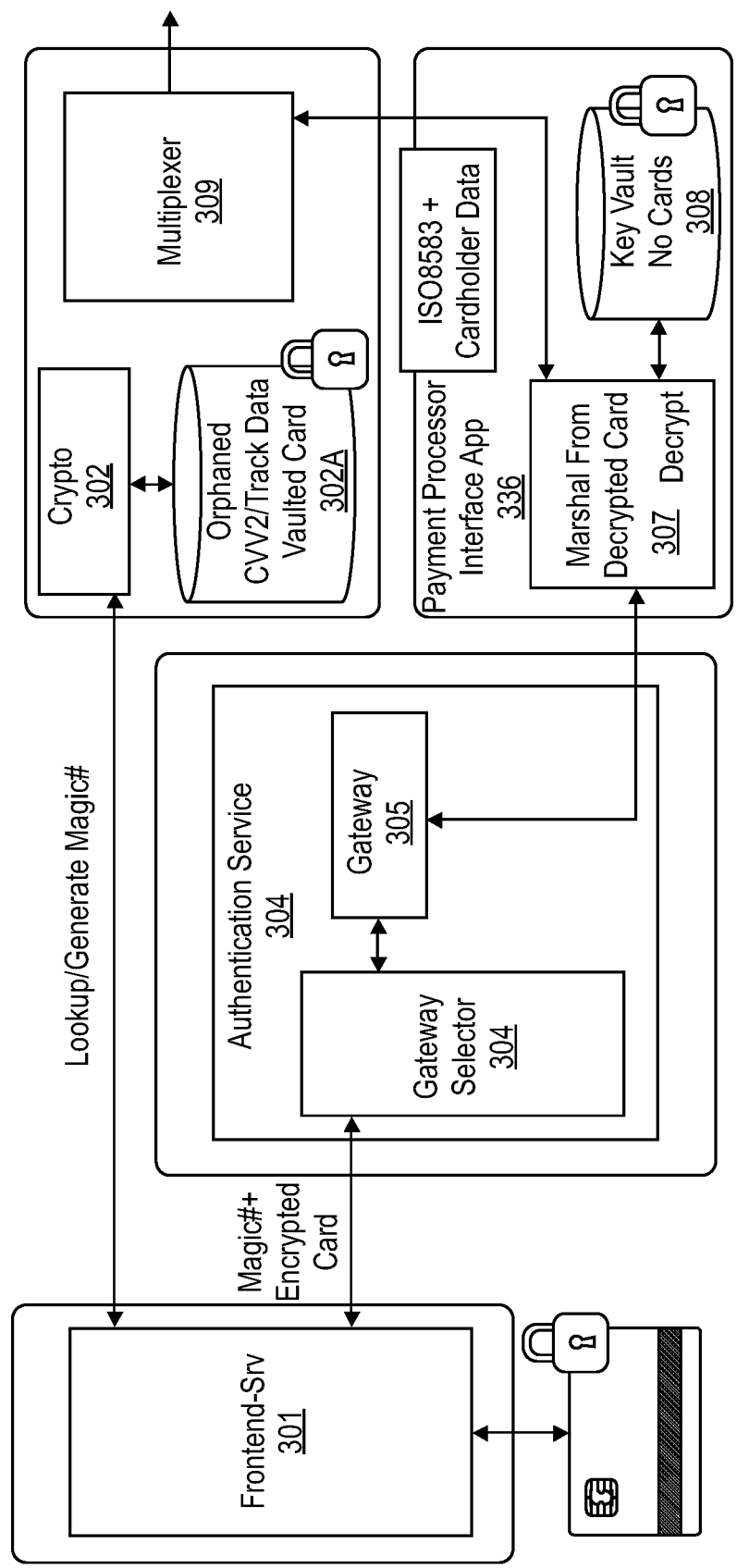
FIG. 3 is an example of other payment processing software that may be included in a testing environment for performing end-to-end financial transactions for card present transactions.

FIG. 3 illustrates an example of some additional code that may be included and executed when testing payment processing code. This code may be running in the same development box or may be run on systems (e.g., servers) accessible by software running in the development box. In alternative embodiments, only a portion of this code is included in the testing of the code for the EMV terminal device and EMV kernel.

Referring to FIG. 3, the payment processing code may include front-end service (srv) 301 (e.g., apriori of Stripe, Inc.) and authentication service (e.g., bapi of Stripe, Inc.). For more information on apriori and bapi, see U.S. Pat. No. 10,134,036, entitled "Method and Apparatus for Performing Transactions over a Network Using Cross-origin Communication", incorporated herein by reference.

In one embodiment, front-end svc 301 receives raw card input numbers from a card inserted into an EMV terminal device or from a client. In one embodiment, front-end svc 301 is responsible for sanitizing raw input card numbers to either 1) create a charge or 2) tokenize a card. In either case front-end srv 301 calls into the crypto service 302 to either lookup an existing magic number in database 302A or, in the case of a new credit card number, vault the card in database 302A and generate a new magic number to represent the vaulted card. Once the request has been sanitized and a magic number has been used to replace a raw card number, the request is forwarded to authentication service 303 for merchant authentication and transaction authorization.

In one embodiment, authentication service 303 either handles a directly provided magic number or dereferences the caller's token to arrive at a magic number and uses it to complete authenticate and authorization of the transaction. In one embodiment, the magic number is then used for radar/shield calculations to determine if a charge should be approved for the payment card and merchant. Note that the magic number is also subsequently used to clear the transaction as part of the settlement process.

In response to a magic number or encrypted card information from front-end svc 301, gateway selector 304 selects a gateway when a charge is authenticated to determine the region and card type to choose which gateway should be used to authenticate the charge. In the US, for example, Visa might map to FDC, while in the EU it will route to Visa direct. The gateway is responsible for taking the transaction details, merchant information and EMV card details and using these objects to drive an authentication against the upstream authorization network.

In one embodiment, gateway 305 is an example gateway selected by gateway selector 304 to handle card present transactions and send them, including encrypted card information, to card present payment processor interface application 306. In response, payment processor interface application 306 decrypts the encrypted card information using decryption module 307 and key vault 308.

Once the decrypted card information is obtained, the request for payment is sent, via multiplexer 309, to a company (a processor) appointed to handle credit card transactions. They have connections to various card networks and supply authorization and settlement services to merchants or payment service providers. They can also move the money from the issuing bank to the merchant or acquiring bank.

In one embodiment, during software update testing, those portions of FIG. 3 responsible for routing traffic to processors is also running in the POSIX environment and routes traffic to actual processor endpoints and back to EMV terminal device application for validation. This facilitates end-to-end testing of the payment processing software for a transaction end-to-end.

In one embodiment, the repositories for each part of the software are copied into a development box and the EMV terminal device application, the front-end svc 301, and authentication server 303 to talk to each other over a local host. In one embodiment, payment processor interface application 306 can talk to authentication server 303 over curl or rest, and for any new behaviors, developers can hardcode behavior in authentication server 303 while making use of the existing stubs for front-end srv 301.

In one embodiment, in the case of the EMV vector kernel and EMV terminal device CI builds, a test server is used to stand in for all upstream authorization networks and issuers. This allows for writing test cases that configure EMV cards and performing emulated transactions that validate the end to end behavior of the entire payment processing system. That is, the configuration allows for all payment processing software to be tested end to end in a CI except where the authorization networks and their behavior are stubbed out in favor of the test server.

In another embodiment, the payment processor interface application 306 can be configured to speak directly to an upstream authorization network resource instead of the test server. This mode of operation is used for development and also to run CI test cases against actual network development endpoints.

Figure 4:
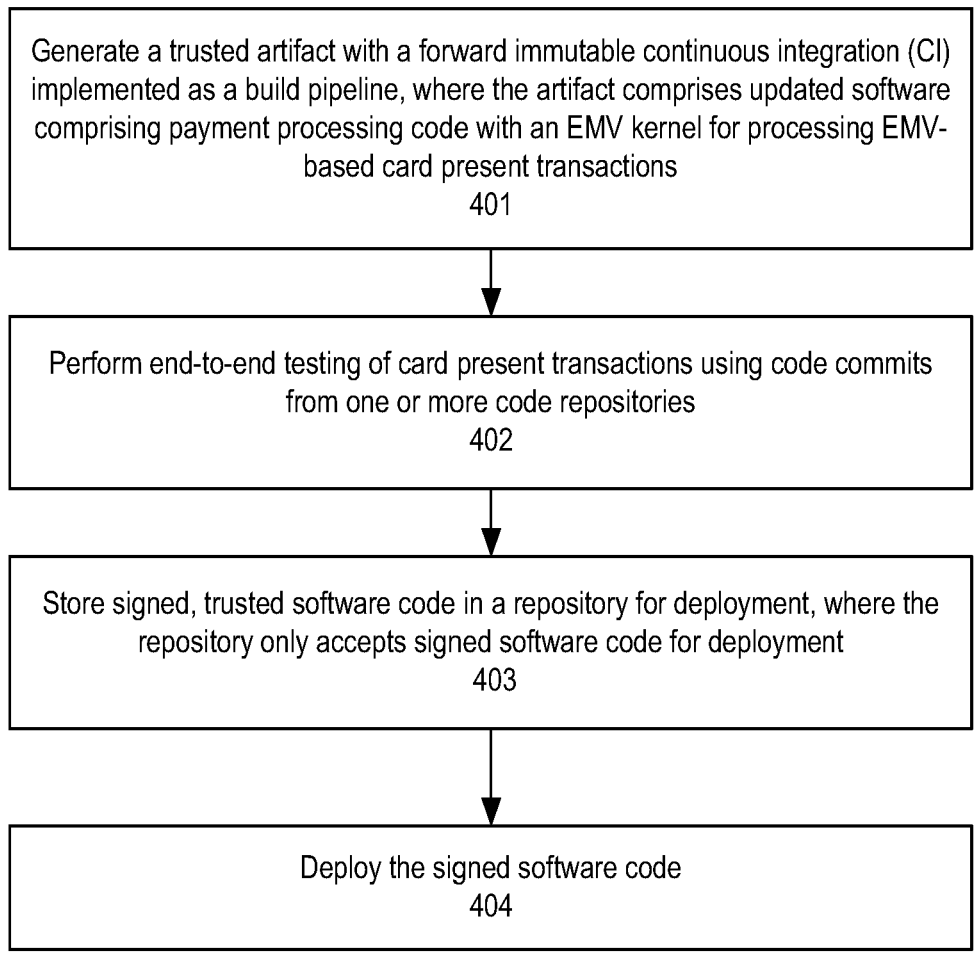
FIG. 4 is a flow diagram of one embodiment of a process for generating and deploying code.

FIG. 4 is a flow diagram of one embodiment of a process for generating and deploying code. The process is performed by processing logic that may comprise hardware (circuitry, dedicated logic, etc.), software (such as is run on a general-purpose computer system, a server, or a dedicated machine), firmware, or a combination of the three.

Referring to FIG. 4, the process begins by processing logic generating a trusted artifact with a forward immutable continuous integration (CI) implemented as a build pipeline, where the artifact comprises updated software comprising payment processing code with an EMV vector kernel for processing EMV-based card present transactions (processing block 401). In one embodiment, the updated software is an updated version of the EMV kernel and/or the EMV kernel as part of the EMV terminal device. In one embodiment, the CI is a forward immutable CI and the build pipeline has a plurality of stages with forward immutability between consecutive pipeline stages, wherein each subsequent stage after a first stage of the build pipeline depends on an immutable output of a previous stage in the build pipeline.

In response to the software update, processing logic performs end-to-end testing of card present transactions using code commits from one or more code repositories (processing block 402). In one embodiment, the testing includes the EMV terminal device software, including an EMV vector kernel and emulated pin pad/reader. That is, the end-to-end testing includes testing processing code for processing EMV-based card present transactions with an EMV vector kernel and one or more EMV cards. In another embodiment, the end-to-end testing includes testing processing code that includes code that runs an EMV card through a terminal device, code of the terminal device that processes the received card including the EMV vector kernel, code for a front-end service (srv) (e.g., apriori of Stripe, Inc.) and authentication service (e.g., bapi of Stripe, Inc.), and a card issuing software stack that parses the received card processing information from the EMV terminal device and generates response codes (e.g., response cryptograms) back to the terminal device, or a subset of these for EMV card present transactions.

After successful testing, processing logic stores signed, trusted software code in a repository for deployment, where the repository only accepts signed software code for deployment (processing block 403) and then processing logic deploys the signed software code (processing block 404).

Figure 5:
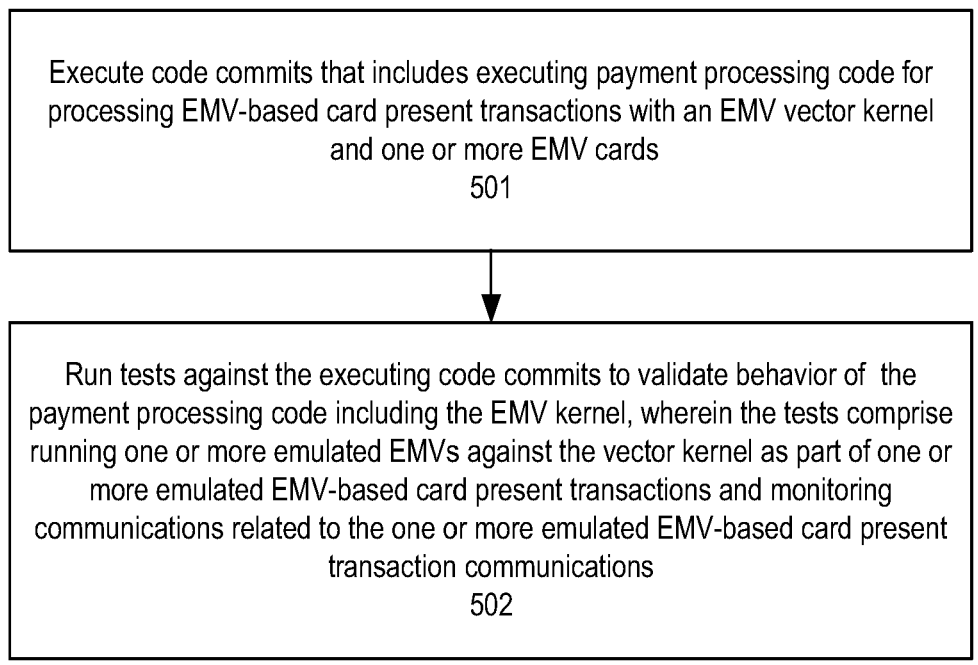
FIG. 5 is a flow diagram of one embodiment of a process for performing end-to-end testing.

FIG. 5 is a flow diagram of one embodiment of a process for performing end-to-end testing. The process is performed by processing logic that may comprise hardware (circuitry, dedicated logic, etc.), software (such as is run on a general-purpose computer system, a server, or a dedicated machine), firmware, or a combination of the three.

Referring to FIG. 5, the process begins by processing logic executing the code commits that includes executing payment processing code for processing EMV-based card present transactions with an EMV vector kernel and one or more EMV cards (processing block 501). In one embodiment, the code commits are executed in a development box. In one embodiment, the payment processing code is run on a first server with a POSIX version of the EMV vector kernel and a pin pad and monitoring communications related to the one or more emulated EMV-based card present transaction communications comprises monitoring traffic flow through the first server. In one embodiment, the transaction communications are simulated transactions over a communications pipe between an emulated EMV vector kernel and one or more emulated EMV cards.

After launching the payment processing cluster, processing logic runs tests against the executing code commits to validate behavior of the payment processing code including the EMV vector kernel, wherein the tests comprise running one or more emulated EMVs against the vector kernel as part of one or more emulated EMV-based card present transactions and monitoring communications related to the one or more emulated EMV-based card present transaction communications (processing block 502).

In one embodiment, running tests comprise validating communications related to the one or more emulated EMV-based card present transaction communications. In one embodiment, communications are validated by verifying a result of the at least one transaction in response to the transaction being performed by software for EMV terminal device emulator based on a comparison of communication messages exchanged between the EMV vector kernel and the payment processing software with expected communication messages of an emulated exchange between an EMV card emulator and the EMV terminal device.

In one embodiment, the test comprises certification tests.

An Example of a Secure Forward Immutable Pipeline

Figure 6:
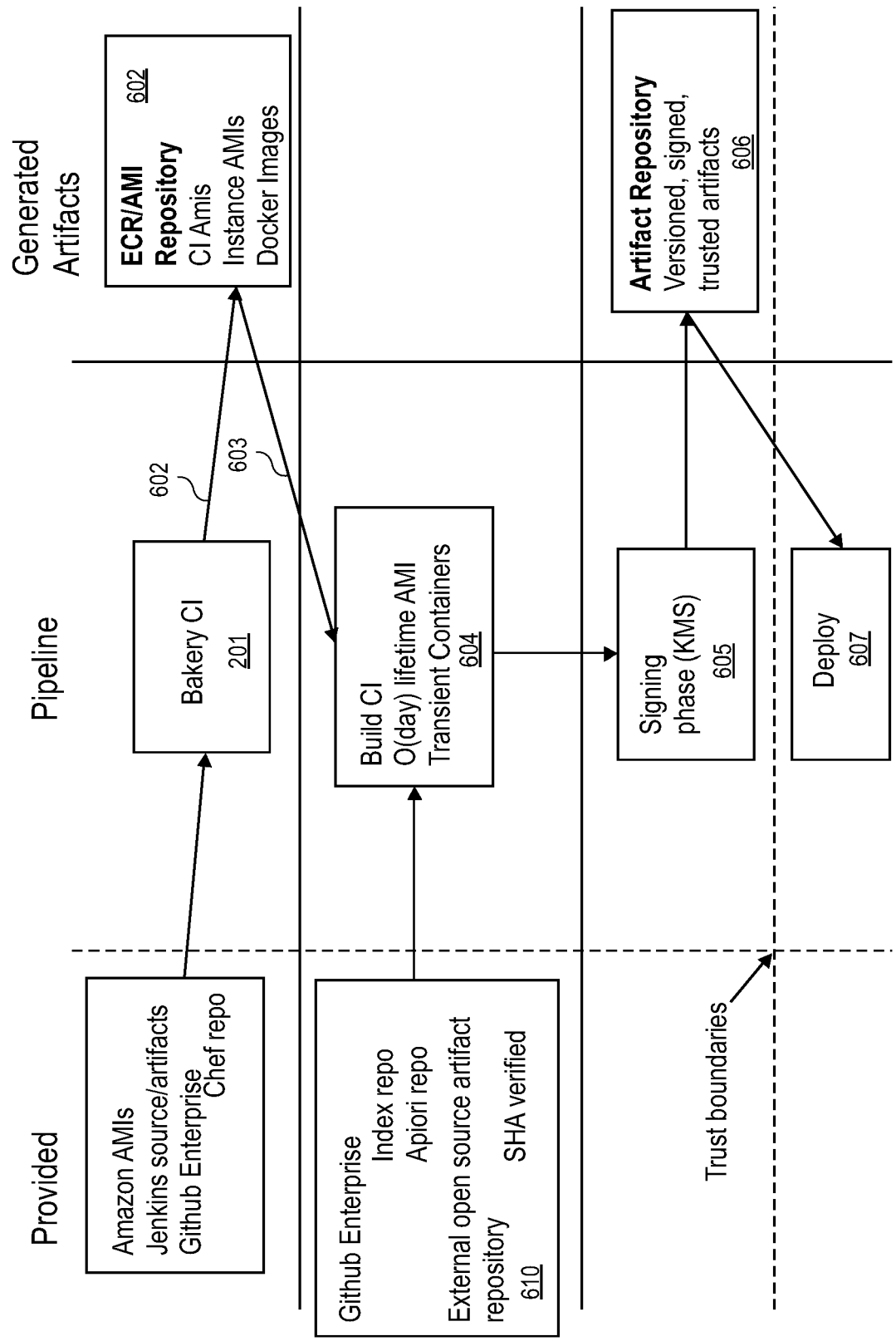
FIG. 6 illustrates one embodiment of a forward immutable CI pipeline.

FIG. 6 illustrates one embodiment of a forward immutable CI pipeline that acts as a secure pipeline to payment processing artifacts/code. In one embodiment, the forward immutable CI pipeline is implemented as a build pipeline consisting of a set of stages. In one embodiment, the first stage of the build pipeline acts as the root of trust for the system. In one embodiment, to ensure security, the root of the pipeline is only accessible to a select group of individual, and includes tight audit features. Each subsequent stage of the build pipeline inherits the security of and depends on the immutable output of the previous stage.

A critical notion of the pipeline is forward immutability such that for each stage of the pipeline, all assets generated in a prior stage are immutable to actors in that stage of the pipeline. To give a specific example, the AMIs/containers generated in phase 601 would be immutable to the run time in phase 603.

Due to the notion of forward immutability, in one embodiment, each stage of the pipeline is only capable of leveraging assets from previous phases of the pipeline, gathering new validated input and building/generating a new output for the following pipeline stage for which the assets would be immutable. Even so, the characteristic of forward immutability allows a chain of trust to be built such that each stage is able to derive its notion of security from the previous stage.

Referring to FIG. 6, the five-stage build pipeline that flows through a bakery CI phase 601, a repository phase 602, a build deploy phase 603, a build CI phase 604, and an emission stage 605.

In one embodiment, bakery CI phase 601 uses continuous integration (CI) to build and test the container images before shipping (or deploying) them to their registry for deployment. The bakery CI stage is the first stage and root of trust in the build pipeline.

In one embodiment, bakery CI phase 601 builds the containers in response to trusted inputs that are provided. In one embodiment, the trusted inputs include one or more of Amazon AMIs, Jenkins source/artifacts, and instances of software. In one embodiment, the Bakery CI stage's trusted input is from a GHE repository that's mostly a Chef configuration (or other configuration language) that provisions AMIs. In one embodiment, the Chef configuration contained in this repository ensures the immutability of the resulting CI and Instance AMIs. For example, in one embodiment, any/all unbounded binaries are removed from the output CI and instance AMIs. Similarly, in one embodiment, build-specific Docker images are tuned to only include compilation tools necessary for the specific build they were designed to execute.

In one embodiment, bakery CI phase 601 is responsible for building a Jenkins master AMI, a Jenkins worker AMI, and any Docker images necessary to run specific builds. In one embodiment, bakery CI phase 601 performs a process of acquiring, building and releasing machine images or other containers to allow repeatable deployments of working code. Thus, bakery CI phase 601 builds containers that include software. In one embodiment, containers are generated by bakery CI phase 601 that include machine images such as, for example, CI Amazon Machine Images (AMIs) and instance AMIs (e.g., AMIs from which cluster servers are launched), and build images (e.g., Docker images used to execute specific builds). Note that in one embodiment, Jenkins master/worker CI nodes are launched from the CI AMIs.

In one embodiment, bakery CI phase 601 is divided into smaller parts such that a Jenkins Bakery CI phase only builds Jenkins AMIs and a subsequent phase builds only Instance AMIs and Docker Images. In one embodiment, future steps of the CI pipeline require Docker to properly isolate containers from one another, and therefore the Chef configuration ensures that Docker is installed and configured properly on these machines.

In one embodiment, bakery CI phase 601 runs on a CI cluster (e.g., VM, server, computer system, etc.). Since bakery CI phase 601 itself runs on a CI cluster, the initial build and bootstrap of the cluster is manual. Beyond the initial build, bakery CI phase 601 leverages prior instances to build the next version.

In one embodiment, the output of a bakery is a baked image that is used to spin off instances of machine images, such as, for example, but not limited to, virtual machines (VMs) or containers, in any compatible environment. The environment may be in the form of hypervisors or container engines that support the deployment of these baked images.

In one embodiment, the artifacts (e.g., containers) generated by the bakery CI phase 601 are stored in and accessed from a repository (e.g., a GitHub Enterprise Chef repository) as part of phase 602. In one embodiment, the repository is a Docker Image/AMI Repository that holds the registry (e.g., an Elastic Container Registry (ECR)) used to store Docker images and AMIs. In one embodiment, the AMIs are stored in an S3 bucket. In one embodiment, both are tagged with the Git SHA (or other hash) used to build them and a build ID.

In one embodiment, while the later stages of the build pipeline enjoy forward immutability from one stage of the pipeline to another, the Bakery CI stage has a similar benefit in the form of temporal immutability. This is due to the fact that in one embodiment, the final output artifact repository is append-only from the Build CI stage such that only new trusted and signed artifacts are produced. The append-only nature of this repository gives the Bakery CI a notion of forward immutability that is temporal i.e. previous builds are immutable to Bakery CI phase. In one embodiment, append-only behavior is implemented by using AWS permissions and/or application logic. Additional secure methods (e.g., artifact signing) may be used. In one embodiment, the repository is read-only from the deploy environment (e.g., read-only from the downstream Build CI), such that the trusted artifacts could not be modified.

After artifacts are generated by bakery CI phase 601 and stored in a repository as part of phase 602, a bakery deploy phase 603 is used to deploy the software to the build CI phase 604. In one embodiment, bakery deploy phase 603 deploys specified CI AMIs to the build CI phase 604. That is, the Bakery CI stage of the pipeline produces trusted CI AMIs that are stored in a repository and deployed to orchestrate the Build CI stage of the pipeline. In one embodiment, the CI AMIs are used to launch Jenkins clusters to orchestrate distributed builds. In such a case, a CI server downloads and builds code from different links, tests the built code including checking for any errors that occur when running them against inbuilt tests using the end-to-end testing described above, and then reports those errors in a log in an automated fashion.

In one embodiment, the Bakery deploy stage uses a "deploy" repository to describe the desired configuration of the AMIs in the Build CI and deploys them to ensure the Build CI is legally configured. This deploy operation gives a build team an additional gate to audit and validate changes and allow for the Bakery to be rolled forward/back as necessary.

In response to the CI AMIs deployed in bakery deploy phase 603 from repository 601 (e.g., a GitHub Enterprise repository, an external open source artifact repository, etc.), build CI phase 604 builds images containing code (e.g., application code) used to execute specific build targets. These build images are output as artifacts.

In one embodiment, the Build CI is triggered by the repository (e.g., any mapped GHE repository), with the triggered build depending upon the previous Bakery CI phase and an immutable Docker image to run the specific build instance. The required images are fetched from the repository (and optionally cached to save bandwidth) and since no additional provisioning is required, a container is launched and the build can start immediately. In one embodiment, a Dockerfile is committed to the source repository that explicitly selects the Docker image build version (produced from the bakery stage) to use.

In one embodiment, the CI build process is as follows. First, an engineer commits a change to the bakery repository. Then that engineer kicks off a build that produces a new Docker image and then creates a series of pull requests (PRs), in each repository, to cause the Dockerfile to use the new Docker image. The PRs get merged in, and the new Docker image is officially in use. Note that this flow blocks the automatic forward trigger of subsequent builds.

In another embodiment, the "consumers" of the Docker image use the "latest" version (i.e., the images are still versioned), but new builds are forward triggered using the "latest" version.

After build CI phase 604, in one embodiment, the output of Build CI phase 604 is a completed/built artifact passed into the artifact emission phase 605, or stage. Emit phase 605 signs the artifacts and puts them into an artifact repository 606 which stores signed artifacts so that they may be deployed during a deploy phase 607. In one embodiment, artifact repository 606 is an append-only repository. In one embodiment, the append-only repository is an append-only S3 bucket in which the bucket has versioning enabled or that a particular S3 key has only one version which once written cannot be modified.

In one embodiment, the signing is performed using GPG keys. In one embodiment, the Shiner KMS-backed signer (e.g., Shiner) signing utility is used for signing the output of the build CI phase 604. The build CI worker is given a signed attestation of the source SHA (and repo metadata) and the CI worker presents Shiner with the attestation and resulting digest and receives a complete attestation (S(source,artifact,metadata)). In one embodiment, this is stored alongside the artifact in an S3 bucket.

Once artifacts are stored in repository 606, they may be deployed using software deploy stage 607. The deployment may involve an orchestration system. In this way, artifacts/software developed and tested as part of a build process is deployed into use.

Because inputs into the forward immutable CI pipeline are trusted inputs (e.g., software code, artifacts, etc.), there is a trust boundary between the inputs and the forward immutable CI pipeline. Furthermore, since the output of the forward immutable CI pipeline is a signed, trusted artifact, the output of the forward immutable CI pipeline also forms a trust boundary. These two trust boundaries and the forward immutability of the CI pipeline itself allow the framework to be provably or demonstrably secure.

Figure 7:
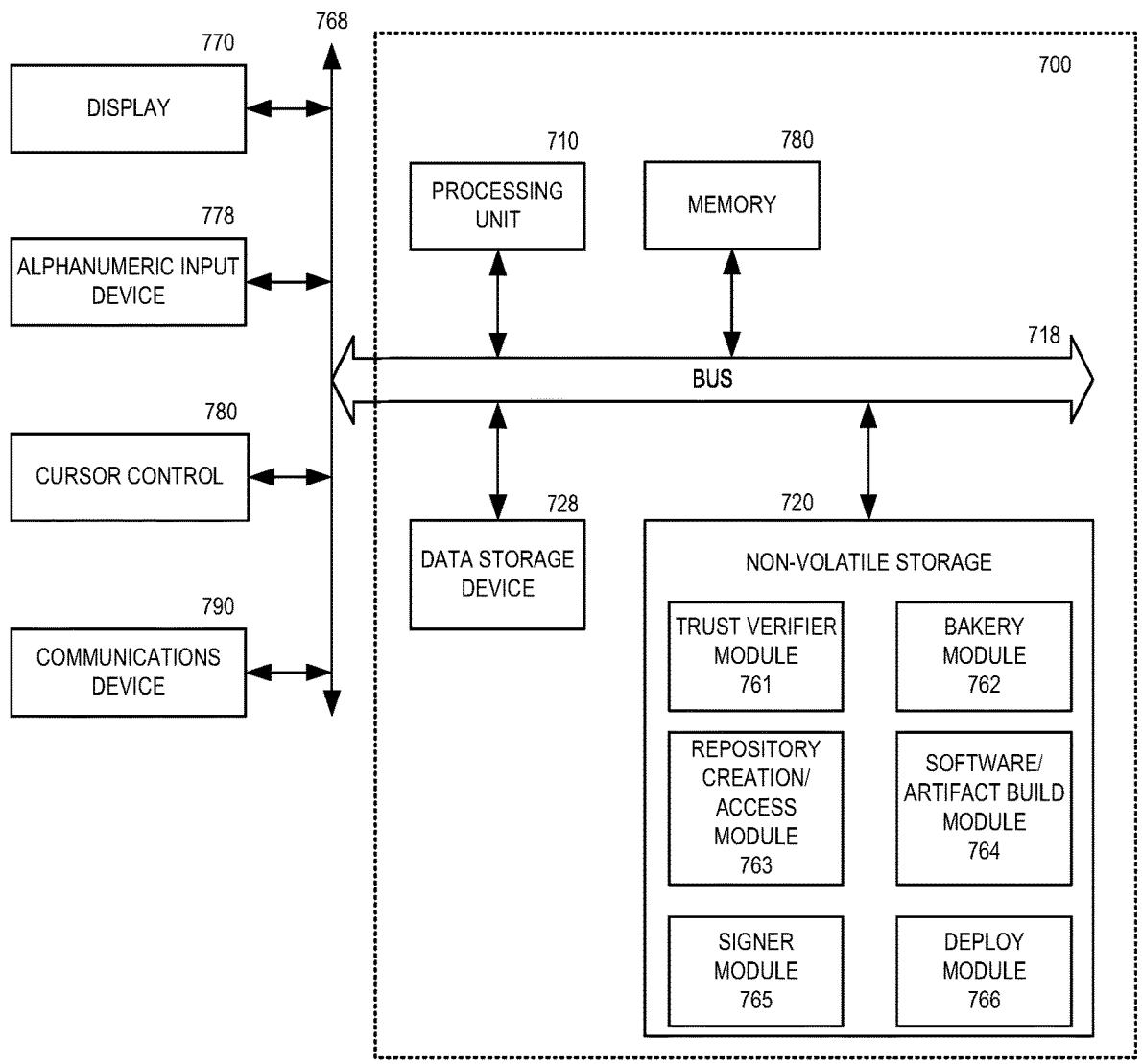
FIG. 7 is one embodiment of a computer system.

FIG. 7 is one embodiment of a computer system that may be used to support the systems and operations discussed herein. It will be apparent to those of ordinary skill in the art, however that other alternative systems of various system architectures may also be used.

The data processing system illustrated in FIG. 7 includes a bus or other internal communication means 715 for communicating information, and a processor 710 coupled to the bus 715 for processing information. The system further comprises a random-access memory (RAM) or other volatile storage device 750 (referred to as memory), coupled to bus 715 for storing information and instructions to be executed by processor 710. Main memory 750 also may be used for storing temporary variables or other intermediate information during execution of instructions by processor 710. The system also comprises a read only memory (ROM) and/or static storage device 720 coupled to bus 715 for storing static information and instructions for processor 710, and a data storage device 725 such as a magnetic disk or optical disk and its corresponding disk drive. Data storage device 725 is coupled to bus 715 for storing information and instructions.

In one embodiment, static storage device 720 stores the EMV testing system including repositories storing emulated EMV terminal device, emulated EMV cards, an emulated communication pipe between the emulated EMV terminal device and emulated EMV cards, and other data and code of the EMV testing system described above.

In one embodiment, static storage device 720 also stores a trust verifier module 761 which when executed causes the system to perform trust verification as described above, stores a bakery module 762 which when executed causes the system to execute a bakery (e.g., CI bakery) as described above, stores a repository creation/access module 763 which when executed causes the system to provide repository services as described above, stores a software/artifact build module 764 which when executed causes the system to perform a build (e.g., a CI build) as described above, stores a signer module 765 which when executed causes the system to sign software as described above, and stores a deploy module 766 which when executed causes the system to deploy software as described above. Note that one or more of these modules may be stored and executed on different machines (e.g., computer systems, severs, etc.).

The system may further be coupled to a display device 770, such as a light emitting diode (LED) display or a liquid crystal display (LCD) coupled to bus 715 through bus 765 for displaying information to a computer user. An alphanumeric input device 775, including alphanumeric and other keys, may also be coupled to bus 715 through bus 765 for communicating information and command selections to processor 710. An additional user input device is cursor control device 780, such as a touchpad, mouse, a trackball, stylus, or cursor direction keys coupled to bus 715 through bus 765 for communicating direction information and command selections to processor 710, and for controlling cursor movement on display device 770.

Another device, which may optionally be coupled to computer system 700, is a communication device 790 for accessing other nodes of a distributed system via a network. The communication device 790 may include any of a number of commercially available networking peripheral devices such as those used for coupling to an Ethernet, token ring, Internet, or wide area network. The communication device 790 may further be a null-modem connection, or any other mechanism that provides connectivity between the computer system 700 and the outside world. Note that any or all of the components of this system illustrated in FIG. 7 and associated hardware may be used in various embodiments as discussed herein.

There are a number of example embodiments described herein.

Example 1 is a method comprising: generating a trusted artifact with a forward immutable continuous integration (CI) implemented as a build pipeline, wherein the artifact comprises updated software comprising payment processing code with an EMV vector kernel for processing of EMV-based card present transactions; and in response to the software update, performing end-to-end testing of EMV card present transactions using code commits from one or more code repositories, wherein the end-to-end testing comprises executing the code commits that includes executing payment processing code for processing EMV-based card present transactions with an EMV vector kernel and one or more emulated EMV cards, and running tests against the executing code commits to validate behavior the payment processing code including the EMV vector kernel, wherein the tests comprise running one or more emulated EMV cards against the vector kernel as part of one or more emulated EMV-based card present transactions and monitoring communications related to the one or more emulated EMV-based card present transaction communications.

Example 2 is the method of example 1 that may optionally include that the payment processing code is run on a first server with a POSIX version of the EMV vector kernel and a pin pad and monitoring communications related to the one or more emulated EMV-based card present transaction communications comprises monitoring traffic flow through the first server.

Example 3 is the method of example 1 that may optionally include that the test comprises certification tests.

Example 4 is the method of example 1 that may optionally include that running tests comprise validating communications related to the one or more emulated EMV-based card present transaction communications.

Example 5 is the method of example 4 that may optionally include that communications are validated by verifying a result of the at least one transaction in response to the transaction being performed by software for an emulated EMV terminal device based on a comparison of communication messages exchanged between the EMV vector kernel and the payment processing software with expected communication messages of an emulated exchange between an emulated EMV card and the emulated EMV terminal device.

Example 6 is the method of example 1 that may optionally include that the CI is a forward immutable CI and the build pipeline has a plurality of stages with forward immutability between consecutive pipeline stages, wherein each subsequent stage after a first stage of the build pipeline depends on an immutable output of a previous stage in the build pipeline.

Example 7 is the method of example 1 that may optionally include storing signed, trusted software code in a repository for deployment, the repository only accepting signed software code for deployment.

Example 8 is the method of example 7 that may optionally include deploying the signed software code.

Example 9 is a non-transitory computer readable storage media having instructions stored thereupon which, when executed by a system having at least a processor and a memory therein, cause the system to perform a method comprising: generating a trusted artifact with a forward immutable continuous integration (CI) implemented as a build pipeline, wherein the artifact comprises updated software comprising payment processing code with an EMV vector kernel for processing of EMV-based card present transactions; and in response to the software update, performing end-to-end testing of card present transactions using code commits from one or more code repositories, wherein the end to end testing comprises executing the code commits that includes executing payment processing code for processing EMV-based card present transactions with an EMV vector kernel and one or more emulated EMV cards, and running tests against the executing code commits to validate behavior the payment processing code including the EMV vector kernel, wherein the tests comprise running one or more emulated EMV cards against the vector kernel as part of one or more emulated EMV-based card present transactions and monitoring communications related to the one or more emulated EMV-based card present transaction communications.

Example 10 is the non-transitory computer readable storage media of example 9 that may optionally include that the payment processing code is run on a first server with a POSIX version of the EMV vector kernel and a pin pad and monitoring communications related to the one or more emulated EMV-based card present transaction communications comprises monitoring traffic flow through the first server.

Example 11 is the non-transitory computer readable storage media of example 9 that may optionally include that the test comprises certification tests.

Example 12 is the non-transitory computer readable storage media of example 9 that may optionally include that running tests comprise validating communications related to the one or more emulated EMV-based card present transaction communications.

Example 13 is the non-transitory computer readable storage media of example 12 that may optionally include that communications are validated by verifying a result of the at least one transaction in response to the transaction being performed by software for an emulated EMV terminal device based on a comparison of communication messages exchanged between the EMV vector kernel and the payment processing software with expected communication messages of an emulated exchange between an emulated EMV card and the emulated EMV terminal device.

Example 14 is the non-transitory computer readable storage media of example 9 that may optionally include that the CI is a forward immutable CI and the build pipeline has a plurality of stages with forward immutability between consecutive pipeline stages, wherein each subsequent stage after a first stage of the build pipeline depends on an immutable output of a previous stage in the build pipeline.

Example 15 is a system comprising: one or more hardware processors; a memory comprising instructions which, when executed by the one or more hardware processors, cause the system to: generate a trusted artifact with a forward immutable continuous integration (CI) implemented as a build pipeline, wherein the artifact comprises updated software comprising payment processing code with an EMV vector kernel for processing of EMV-based card present transactions; and in response to the software update, perform end-to-end testing of card present transactions using code commits from one or more code repositories, wherein the end to end testing comprises executing the code commits that includes executing payment processing code for processing EMV-based card present transactions with an EMV vector kernel and one or more emulated EMV cards, and running tests against the executing code commits to validate behavior the payment processing code including the EMV vector kernel, wherein the tests comprise running one or more emulated EMV cards against the vector kernel as part of one or more emulated EMV-based card present transactions and monitoring communications related to the one or more emulated EMV-based card present transaction communications.

Example 16 is the system of example 15 that may optionally include that the payment processing code is run on a first server with a POSIX version of the EMV vector kernel and a pin pad and monitoring communications related to the one or more emulated EMV-based card present transaction communications comprises monitoring traffic flow through the first server.

Example 17 is the system of example 15 that may optionally include that the test comprises certification tests.

Example 18 is the system of example 15 that may optionally include that running tests comprise validating communications related to the one or more emulated EMV-based card present transaction communications.

Example 19 is the system of example 18 that may optionally include that communications are validated by verifying a result of the at least one transaction in response to the transaction being performed by software for an emulated EMV terminal device based on a comparison of communication messages exchanged between the EMV vector kernel and the payment processing software with expected communication messages of an emulated exchange between an emulated EMV card and the emulated EMV terminal device.

Example 20 is the system of example 15 that may optionally include that the CI is a forward immutable CI and the build pipeline has a plurality of stages with forward immutability between consecutive pipeline stages, wherein each subsequent stage after a first stage of the build pipeline depends on an immutable output of a previous stage in the build pipeline.

It will be apparent to those of ordinary skill in the art that the system, method, and process described herein can be implemented as software stored in main memory or read only memory and executed by processor. This control logic or software may also be resident on an article of manufacture comprising a non-transitory computer readable medium having computer readable program code embodied therein and being readable by the mass storage device and for causing the processor to operate in accordance with the methods and teachings herein.

Some portions of the detailed description described above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "generating", "providing", "encrypting", "decrypting", "selecting", "performing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

Whereas many alterations and modifications of the present invention will no doubt become apparent to a person of ordinary skill in the art after having read the foregoing description, it is to be understood that any particular example shown and described by way of illustration is in no way intended to be considered limiting. Therefore, references to details of various examples are not intended to limit the scope of the claims which in themselves recite only those features regarded as essential to the invention.

What is claimed is:

1. A method comprising:
  generating an updated software comprising payment processing code with an EMV (Europay, Mastercard, Visa) vector kernel for processing of EMV-based card present transactions; and
  performing end-to-end testing of EMV card present transactions using the updated software, wherein the end-to-end testing comprises:
    executing code commits that includes executing payment processing code for processing EMV-based card present transactions with an EMV vector kernel and one or more emulated EMV cards, and
    running tests against the executing code commits to validate behavior the payment processing code including the EMV vector kernel, wherein the tests comprise running one or more emulated EMV cards against the vector kernel as part of one or more emulated EMV-based card present transactions and monitoring communications related to the one or more emulated EMV-based card present transactions.

2. The method of claim 1 wherein running tests comprise validating communications related to the one or more emulated EMV-based card present transaction communications.

3. The method of claim 2 wherein communications are validated by verifying a result of the at least one transaction in response to the transaction being performed by software for an emulated EMV terminal device based on a comparison of communication messages exchanged between the EMV vector kernel and the payment processing software with expected communication messages of an emulated exchange between an emulated EMV card and the emulated EMV terminal device.

4. The method of claim 1 wherein the test comprises certification tests.

5. The method of claim 1 wherein the payment processing code is run on a first server with an operating system interface version of the EMV vector kernel and a pin pad and monitoring communications related to the one or more emulated EMV-based card present transaction communications comprises monitoring traffic flow through the first server.

6. The method of claim 1 wherein the updated software is part of a trusted artifact generated with a forward immutable continuous integration (CI) implemented as a build pipeline.

7. The method of claim 6 wherein the CI is a forward immutable CI and the build pipeline has a plurality of stages with forward immutability between consecutive pipeline stages, wherein each subsequent stage after a first stage of the build pipeline depends on an immutable output of a previous stage in the build pipeline.

8. The method of claim 1 wherein performing the end-to-end testing of EMV card present transactions is performed using code commits from one or more code repositories.

9. The method of claim 1 further comprising deploying the updated software code after end-to-end testing.

10. A system comprising:
  a memory comprising instructions; and
  one or more hardware processors to execute the instructions and, in response thereto, perform end-to-end testing of EMV (Europay, Mastercard, Visa) card present transactions using updated software, wherein the end-to-end testing by at least:
    executing code commits that includes executing payment processing code for processing EMV-based card present transactions with an EMV vector kernel and one or more emulated EMV cards, and
    running tests against the executing code commits to validate behavior the payment processing code including the EMV vector kernel, wherein the tests comprise running one or more emulated EMV cards against the vector kernel as part of one or more emulated EMV-based card present transactions and monitoring communications related to the one or more emulated EMV-based card present transactions.

11. The system of claim 10 wherein one or more hardware processors are operable to run tests to validate communications related to the one or more emulated EMV-based card present transaction communications.

12. The system of claim 11 wherein communications are validated by verifying a result of the at least one transaction in response to the transaction being performed by software for an emulated EMV terminal device based on a comparison of communication messages exchanged between the EMV vector kernel and the payment processing software with expected communication messages of an emulated exchange between an emulated EMV card and the emulated EMV terminal device.

13. The system of claim 10 wherein the test comprises certification tests.

14. The system of claim 10 wherein the payment processing code is run with an operating system interface version of the EMV vector kernel and a pin pad and the one or more hardware processors monitor communications related to the one or more emulated EMV-based card present transaction communications by monitoring traffic flow through a first server.

15. The system of claim 10 wherein the updated software is part of a trusted artifact generated with a forward immutable continuous integration (CI) implemented as a build pipeline, wherein the CI is a forward immutable CI and the build pipeline has a plurality of stages with forward immutability between consecutive pipeline stages, wherein each subsequent stage after a first stage of the build pipeline depends on an immutable output of a previous stage in the build pipeline, and further wherein the end-to-end testing of EMV card present transactions is performed using code commits from one or more code repositories that were output from the build pipeline.

16. A non-transitory computer readable storage media having instructions stored thereupon which, when executed by a system having at least a processor and a memory therein, cause the system to perform a method comprising:

performing end-to-end testing of EMV (Europay, Mastercard, Visa) card present transactions using the updated software, wherein the end-to-end testing comprises:
- executing the code commits that includes executing payment processing code for processing EMV-based card present transactions with an EMV vector kernel and one or more emulated EMV cards, and
- running tests against the executing code commits to validate behavior the payment processing code including the EMV vector kernel, wherein the tests comprise running one or more emulated EMV cards against the vector kernel as part of one or more emulated EMV-based card present transactions and monitoring communications related to the one or more emulated EMV-based card present transactions.

17. The non-transitory computer readable storage media of claim 16 wherein the updated software is part of a trusted artifact generated with a forward immutable continuous integration (CI) implemented as a build pipeline.

18. The non-transitory computer readable storage media of claim 17 wherein the CI is a forward immutable CI and the build pipeline has a plurality of stages with forward immutability between consecutive pipeline stages, wherein each subsequent stage after a first stage of the build pipeline depends on an immutable output of a previous stage in the build pipeline.

19. The non-transitory computer readable storage media of claim 16 wherein performing the end-to-end testing of EMV card present transactions is performed using code commits from one or more code repositories.

20. The non-transitory computer readable storage media of claim 16 further comprising deploying the updated software code after end-to-end testing.

\* \* \* \* \*